United States Patent
Arthur et al.

(10) Patent No.: US 8,372,555 B2
(45) Date of Patent: Feb. 12, 2013

(54) STACK END CELL HEATER CONTROL METHODOLOGY

(75) Inventors: David A. Arthur, Honeoye Falls, NY (US); Abdullah B. Alp, West Henrietta, NY (US); Joseph Mussro, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2176 days.

(21) Appl. No.: 11/475,753

(22) Filed: Jun. 27, 2006

(65) Prior Publication Data

US 2007/0298297 A1    Dec. 27, 2007

(51) Int. Cl.
*H01M 8/04* (2006.01)
*H01M 8/10* (2006.01)

(52) U.S. Cl. ........ 429/443; 429/434; 429/479; 429/433; 429/436

(58) Field of Classification Search ........................ None
See application file for complete search history.

(56) References Cited

U.S. PATENT DOCUMENTS

2004/0053092 A1*   3/2004   Kato et al. ........................ 429/22

FOREIGN PATENT DOCUMENTS

| JP | 2004 178950 A | 6/2004 |
| JP | 2005-174600 A | 6/2005 |

* cited by examiner

*Primary Examiner* — Barbara Gilliam
*Assistant Examiner* — Angela Martin
(74) *Attorney, Agent, or Firm* — John A. Miller; Miller IP Group, PLC

(57) ABSTRACT

A fuel cell system that employs end cell heaters in the end cells of a fuel cell stack in the fuel cell system that consistently maintain the temperature of the end cells above the operating temperature of the stack so as to reduce water in the end cells. In one embodiment, the temperature of the end cells is maintained within the range of 80° C.-85° C. across the entire output power range of the fuel cell stack. In accordance with another embodiment of the invention, the end cells are electrically coupled in series, and the control signal for controlling the end cells heaters is selected to heat the warmest end cell to the desired temperature.

20 Claims, 1 Drawing Sheet

STACK END CELL HEATER CONTROL METHODOLOGY

BACKGROUND OF THE INVENTION

1. Field of the Invention

This invention relates generally to a system and method for controlling the current flow to end cell heaters in a split fuel cell stack and, more particularly, to a system and method for controlling the current flow to end cell heaters in a split fuel cell stack where the end cell heaters are controlled to maintain a predetermined temperature in the end cells above the operating temperature of the fuel cell stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

For automotive applications, it typically takes about 400 fuel cells to provide the desired power. Because so many fuel cells are required for the stack in automotive fuel cell system designs, the stack is sometimes split into two sub-stacks each including about 200 fuel cells because it is difficult to effectively provide an equal flow of hydrogen gas through 400 fuel cells in parallel.

The membrane within a fuel cell needs to have a certain relative humidity so that the ionic resistance across the membrane is low enough to effectively conduct protons. This humidification may come from the stack water by-product or external humidification. The flow of the reactant gas through the flow channels has a drying effect on the membrane, most noticeably at an inlet of the flow channels. Also, the accumulation of water droplets within the flow channels from the membrane relative humidity and water by-product could prevent reactant gas from flowing therethrough, and cause the cell to fail, thus affecting the stack stability. The accumulation of water in the reactant gas flow channels is particularly troublesome at low stack output loads.

The end cells in a fuel cell stack typically have a lower performance than the other cells in the stack. Particularly, the end cells are exposed to ambient temperature, and thus have a temperature gradient that causes them to operate at a lower temperature as a result of convective heat losses. Because the end cells are typically cooler than the rest of the cells in the stack, gaseous water more easily condenses into liquid water so that in the end cells have a higher relative humidity, which causes water droplets to more readily form in the flow channels of the end cells. Further, at low stack load, the amount of reactant gas flow available to push the water out of the flow channels is significantly reduced. Also, at low stack loads the temperature of the cooling fluid is reduced, which reduces the temperature of the stack and typically increases the relative humidity of the reactant gas flow.

It is known in the art to heat the end cells with resistive heaters positioned between the unipolar plate and the MEA so as to compensate for convective heat losses. These known systems typically attempted to maintain the end cell temperature the same as the other cells in the stack by monitoring the temperature of the cooling fluid out of the stack. However, lower cell voltages for the end cells are still a problem even with the addition of such heaters.

SUMMARY OF THE INVENTION

In accordance with the teachings of the present invention, a fuel cell system is disclosed that employs end cell heaters in the end cells of a fuel cell stack in the fuel cell system that consistently maintain the temperature of the end cells above the operating temperature of the stack so as to reduce water in the end cells. In one embodiment, the temperature of the end cells is maintained within the range of 80° C.-85° C. across the entire output power range of the fuel cell stack. In accordance with another embodiment of the invention, the end cells are electrically coupled in series, and the control signal for controlling the end cells heaters is selected to heat the warmest end cell to the desired temperature.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system employing a technique for controlling end cell heaters in a split fuel cell stack is merely exemplary in nature, and is in no way intended to limit the invention or its applications or uses.

Figure 1:
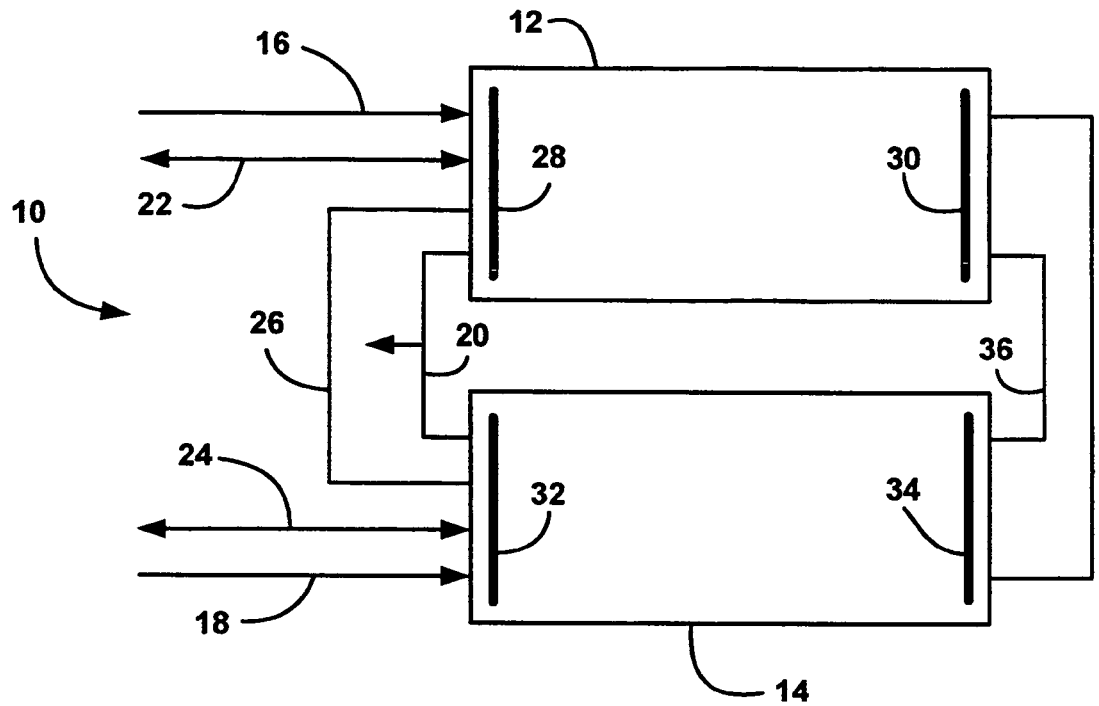
FIG. 1 is a schematic block diagram of a fuel cell system including split stacks having end cell heaters.

FIG. 1 is a schematic block diagram of a fuel cell system 10 including a first split fuel cell stack 12 and a second split fuel cell stack 14. The split stack 12 receives a cathode input airflow on line 16 and the split stack 14 receives a cathode input air flow on line 18, typically from a compressor (not shown). The cathode exhaust is output on line 20 from both of the split stacks 12 and 14. The split stacks 12 and 14 employ anode flow shifting where the anode reactant gas flows back and forth through the split stack cells 12 and 14 at a predetermined cycle. Therefore, the anode reactant gas flows in and out of the split stack 12 on line 22 and in and out of the split stack 14 on line 24. An anode connecting line 26 connects the anode channels in the split stacks 12 and 14.

The split stack 12 includes end cell heaters 28 and 30 positioned within the end cells of the split stack 12. Likewise, the split stack 14 includes end cell heaters 32 and 34 positioned within the end cells of the split stack 14. The end cell heaters 28-34 are positioned at suitable location in the end cells of the split stacks 12 and 14, such as between the unipolar plate and the MEA, so that each split stack 12 and 14 includes two end cell heaters. The heaters 28-34 can be any suitable heater for this purpose, such as a resistive heater. A cooling fluid flows through a coolant loop 36 and through cooling fluid flow channels in the split stacks 12 and 14 to control their operating temperature, as is well understood in the art.

According to the invention, the end cell heaters 28-34 are controlled so that their temperature is maintained at a predetermined temperature that is higher than the operating temperature of the fuel cell system 10. Particularly, the operating temperature of the split stacks 12 and 14 is controlled by the temperature of the cooling fluid flowing through the coolant loop 36. At low stack load, the temperature of the cooling fluid may drop to as low 60° C., and at high stack load, the temperature of the cooling fluid may rise to 80° C. According to the invention, the temperature provided by the end cell heaters 28-34 is not tied to the cooling fluid temperature, but is maintained at an elevated temperature through the entire power range and cooling fluid temperature of the system 10.

It is known in the art that the glass transition temperature of certain membranes for fuel cells is about 90° C. According to one embodiment of the present invention, the end cell heaters 28-34 are controlled so that the temperature of the end cells of the split stacks 12 and 14 is in a range of 80° C.-85° C., and particularly 82° C. Heating the end cells to a temperature in this range is particularly effective if the current density of the split stacks 12 and 14 is less than 0.2 Acm$^2$ because the end cell heaters 28-34 are not effective at such a low load and only add a parasitic load. Further, heating the end cells in this range is also particularly effective if the cooling fluid temperature drops below 60° C. because there is a lot of water at lower temperatures that could easily block the flow channels in the end cells. Also the heaters 28-34 add a load to the system that is helpful in warming the system 10 as quickly as possible to the ideal operating temperature at system start-up.

Typically, the end cell heaters 28-34 are electrically connected in series. Because the system 10 employs flow shifting between the anode flow channels in the split stacks 12 and 14, the split stacks 12 and 14 will have a wet end and a dry end depending on which stack the fresh hydrogen is being sent to. The wet end cells of the split stacks 12 and 14 do not tend to heat up as quickly as the dry end cells of the split stacks 12 and 14. This is a result of the extra water present in the wet end that must be heated by the cell heaters, causing the need for more energy to heat the wet end.

In order to overcome this problem for end cell heaters connected in series, the present invention proposes sensing the temperature of the end cells, and providing an appropriate current flow for the warmest of the end cells to the desired temperature at any particular point in time.

Figure 2:
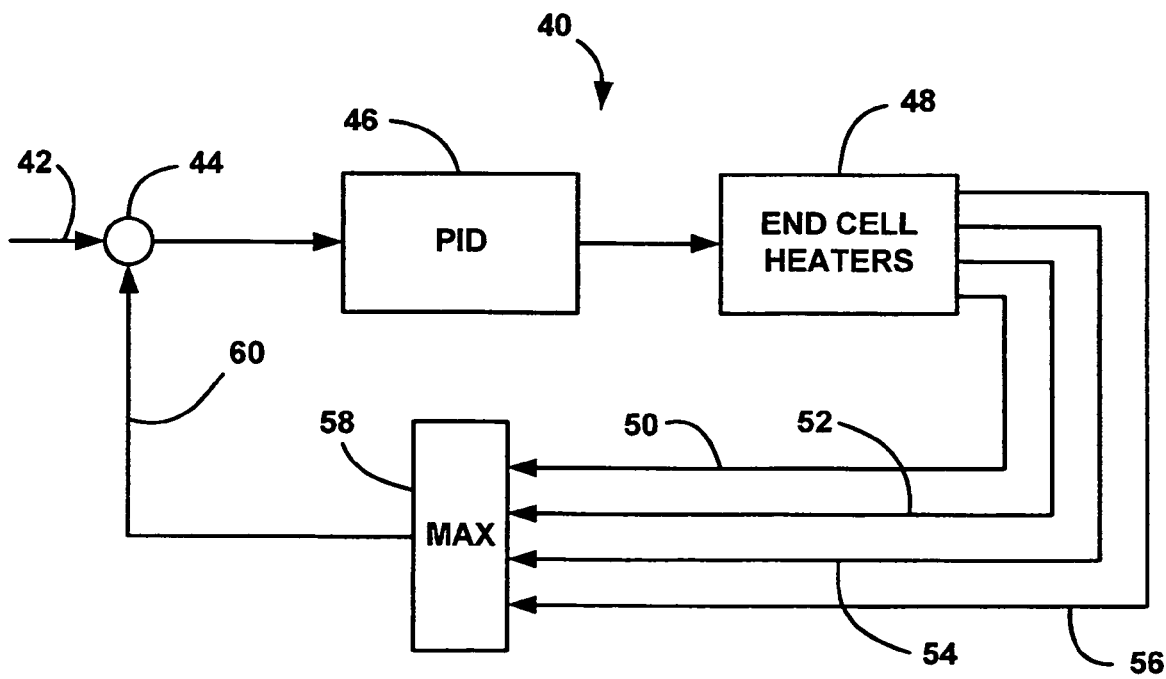
FIG. 2 is a block diagram of a control system for controlling the end cell heaters in the split stacks of the fuel cell system shown in FIG. 1, according to an embodiment of the present invention.

FIG. 2 is a block diagram of a control system 40 for controlling the temperature of end cell heaters 48, representing the end cell heaters 28-34. The desired temperature set-point signal for the end cell heaters 48 are provided at input line 42 to a comparator 44. The output signal of the comparator 44 is sent to a proportional-integral-derivative (PID) controller 46 that converts the set-point signal to a pulse width modulated (PWM) signal suitable for controlling the end cell heaters 48. The PWM signal will cause the end cell heaters 48 to provide heat during the high pulses and be shut off during low pulses. Each end cell heater 28-34 includes a temperature sensor, such as a thermocouple, that provides a signal indicative of the temperature of the end cell. For example, output line 50 provides a temperature signal of the dry end of the split stack 12, output line 52 provides a temperature signal of the wet end of the split stack 12, output line 54 provides a temperature signal of the dry end of the split stack 14 and output line 56 provides a temperature signal of the wet end of the split stack 14. All of these signals are provided to a maximum processor 58 that selects the maximum temperature signal indicating the temperature of the warmest end cell which is fed to the comparator 44 on line 60. The comparator 44 provides an error signal to the PID controller 46 of the difference between the temperature set-point and the actual temperature so that all of the end cell heaters 48 are controlled to the temperature of the warmest end cell.

In other embodiments, the end cell heaters 28-34 may not connected in series, but are independently controlled. In this embodiment, the control system could include a PID controller for each end cell heater so that they would be controlled independently of each other. Further, controlling the temperature of the end cell heaters has application for single stack designs including two end cell heaters.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including a first end cell and a second end cell;
a first end cell heater positioned in the first end cell and a second end cell heater positioned in the second end cell; and
a controller, said controller configured to provide a control signal to the first and second end cell heaters so that the temperature of the first and second end cells is maintained at a temperature above the operating temperature of the fuel cell stack.

2. The system according to claim 1 wherein the controller controls the temperature of the end cells to be in the range of 80° C.-85° C.

3. The system according to claim 2 wherein the controller controls the temperature of the end cells to be 82° C.

4. The system according to claim 1 wherein the first and second end cell heaters are electrically coupled in series, said controller selecting a control signal for the first and second end cell heaters that heat the end cells to a desired temperature for the warmest end cell.

5. The system according to claim 4 wherein the first and second end cells include temperature sensors, said temperature sensors providing a temperature signal to the controller indicative of the temperature of the end cells so that the controller can heat the end cells based on the temperature of the warmest end cell.

6. The system according to claim 1 wherein the controller controls the first and second end cell heaters to heat the end cells to a temperature more than 20° C. above a cooling fluid temperature cooling the stack if the temperature of the cooling fluid is at 60° C. or below.

7. The system according to claim 1 wherein the controller controls the first and second end cell heaters to heat the end cells to a temperature more than 20° C. above a cooling fluid temperature cooling the stack if the current density of the stack is 0.2 $Acm^2$ or less.

8. The system according to claim 1 wherein the controller maintains the temperature of the end cells above the operating temperature of the fuel cell stack across the entire power range of the stack.

9. A fuel cell system comprising:
a first split stack including a first end cell and a second end cell;
a second split stack including a third end cell and a fourth end cell;
a first end cell heater positioned in the first end cell, a second end cell heater positioned in the second end cell, a third end cell heater positioned in a third end cell and a fourth end cell heater positioned in the fourth end cell; and
a controller configured to control the first, second, third and fourth end cell heaters to control the temperature of the first, second, third and fourth end cells, said controller providing a control signal to the first, second, third and fourth end cell heaters so that the temperature of the first, second, third and fourth end cells is consistently maintained above the operating temperature of the first and second split stacks.

10. The system according to claim 9 wherein the controller heats the temperature of the first, second, third and fourth end cells to a temperature more than 20° C. above a cooling fluid temperature that cools the first and second split stacks when the temperature of the cooling fluid is 60° C. or below or the load on the first and second split stacks is 0.2 $Acm^2$ or less.

11. The system according to claim 9 wherein the controller controls the temperature of the end cells to be in the range of 80° C.-85° C.

12. The system according to claim 11 wherein the controller controls the temperature of the end cells to be 82° C.

13. The system according to claim 9 wherein the first, second, third and fourth end cell heaters are electrically coupled in series, said controller selecting a control signal for the first, second, third and fourth end cells heaters that heat the end cells to a desired temperature for the warmest end cell.

14. The system according to claim 13 wherein the first, second, third and fourth end cells include temperature sensors, said temperature sensors providing a temperature signal to the controller indicative of the temperature of the end cells so that controller can heat the end cells based on the temperature of the warmest end cell.

15. A method for controlling the temperature of end cells in a fuel cell stack, said method comprising:
providing end cell heaters in the end cells of the fuel cell stack; and
controlling the end cell heaters so that the temperature of the end cells is greater than an operating temperature of the fuel cell stack.

16. The method according to claim 15 wherein controlling the end cell heaters includes controlling the end cell heaters to have a temperature in the range of 80° C.-85° C.

17. The method according to claim 16 wherein controlling the end cell heaters includes controlling the end cell heaters to have a temperature of 82° C.

18. The method according to claim 15 further comprising measuring the temperature of the end cells, and controlling the temperature of the end cells based on the warmest end cell.

19. The method according to claim 15 wherein controlling the end cell heaters includes controlling the end cell heaters so that the temperature of the end cells is more than 20° C. than the temperature of a cooling fluid cooling the fuel cell stack if the cooling fluid is 60° C. or less or the output load on the fuel cell stack is 0.2 $Acm^2$ or less.

20. The method according to claim 15 wherein controlling the end cell heaters so that the temperature of the end cells is greater than an operating temperature of the fuel cell stack includes maintaining the temperature of the end cells above the operating temperature of the fuel cell stack across the entire power range of the stack.

\* \* \* \* \*